United States Patent [19]

Fowler

[11] Patent Number: 5,410,618

[45] Date of Patent: Apr. 25, 1995

[54] METHOD FOR LOFARGRAM IMAGE ENHANCEMENT

[75] Inventor: Brooks C. Fowler, Dallas, Tex.

[73] Assignee: E-Systems, Inc., Dallas, Tex.

[21] Appl. No.: 12,726

[22] Filed: Feb. 3, 1993

[51] Int. Cl.$^6$ .......................... G06K 9/40; G06K 9/62; G06K 9/34

[52] U.S. Cl. ........................................ 382/54; 382/39; 382/9

[58] Field of Search ..................... 382/54, 52, 27, 29, 382/39, 43, 49, 9; 395/87, 138, 139; 367/7

[56] References Cited

U.S. PATENT DOCUMENTS

| | | | |
|---|---|---|---|
| 3,833,797 | 9/1974 | Grobman et al. | 235/151.3 |
| 3,890,598 | 6/1975 | Hagen et al. | 367/129 |
| 3,894,348 | 7/1975 | Fontaine | 434/9 |
| 4,736,199 | 4/1988 | Chadwick et al. | 340/728 |
| 4,761,819 | 8/1988 | Denison et al. | 382/54 |
| 4,953,147 | 8/1990 | Cobb | 367/35 |
| 5,008,630 | 4/1991 | Reimel | 328/165 |

OTHER PUBLICATIONS

Rule Based Expert System Approach to High Quality Image Enhancement, J. S. P. Shu, 26th Fall Symposium, SPSE's Conf. & Ex., Arlington, Vir., Oct. 13–17, 1986, pp. 194–207.

Primary Examiner—David K. Moore
Assistant Examiner—Michael R. Cammarata
Attorney, Agent, or Firm—Harold E. Meier

[57] ABSTRACT

A method for enhancing lofargram data images utilizing a rule base. The system takes a plurality of sequentially occurring vertical frequency strips of a lofargram data image and computes an estimate for the mean and variance of each vertical frequency strip. A linear transformation utilizing a rule base is then applied to each pixel of the vertical frequency strip to improve the visual clarity of the lofargram data image.

15 Claims, 8 Drawing Sheets

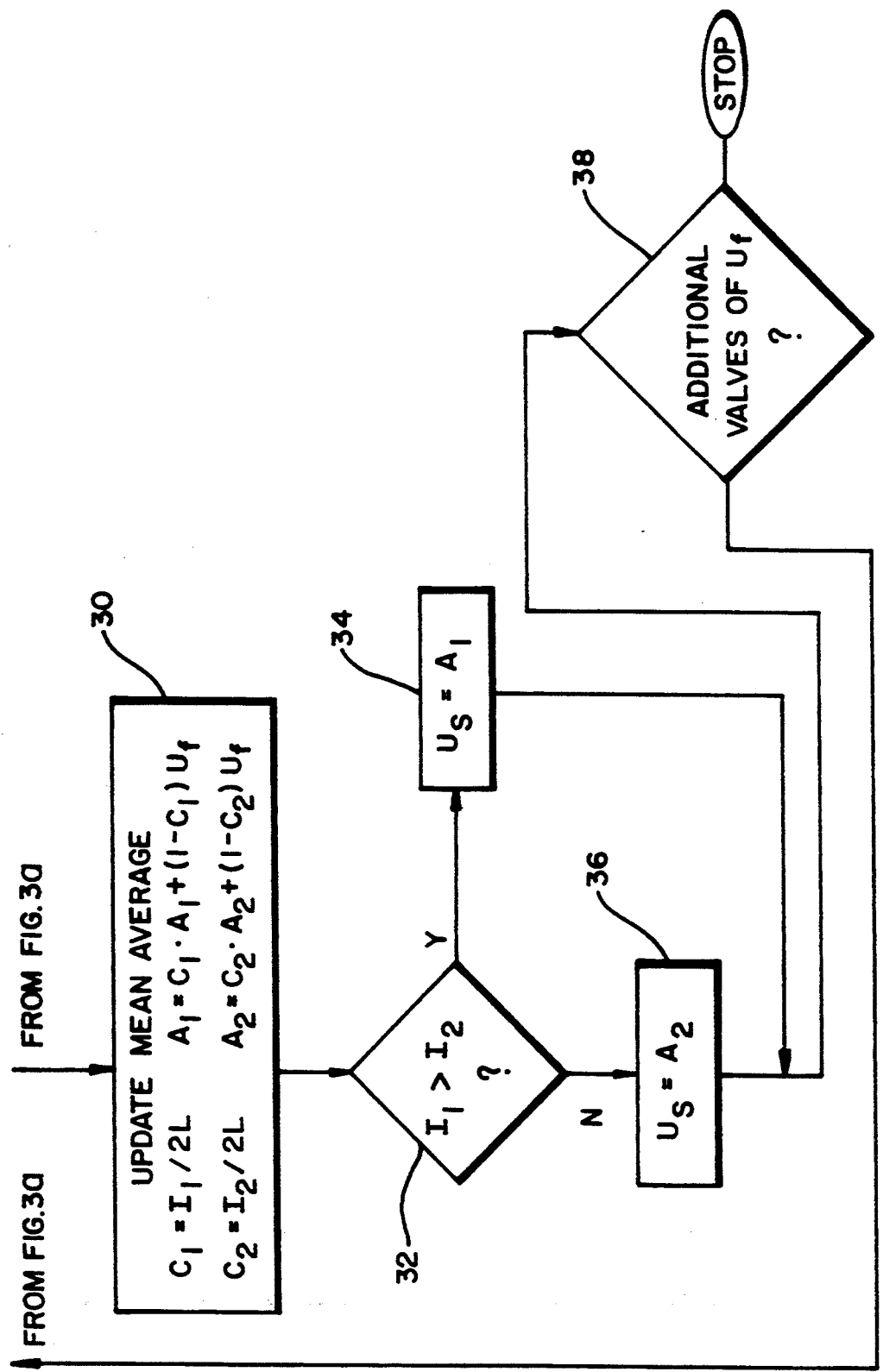

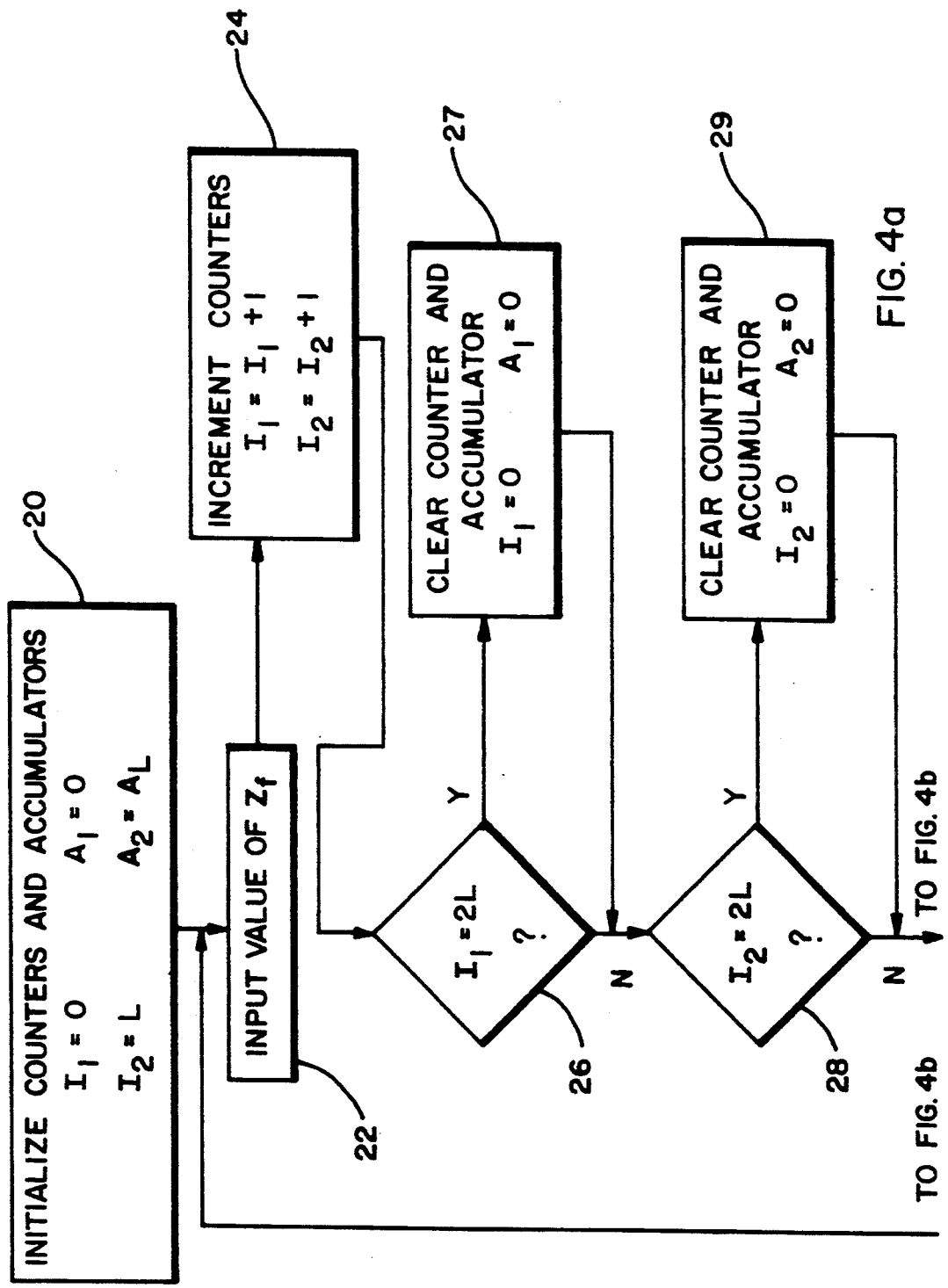

METHOD FOR LOFARGRAM IMAGE ENHANCEMENT

TECHNICAL FIELD

This invention relates to image enhancement techniques, and more specifically to a method for enhancing lofargram image data.

BACKGROUND OF THE INVENTION

Image enhancement encompasses techniques for improving the visual quality of an image for a particular application. Image enhancement techniques are broadly applied to various types of images. Examples of this would include histogram modification of x-ray images to improve their visual quality, gray-scale correction of aerial photographs to promote clarity and smoothing, or sharpening operations of photographs to improve images, reduce noise and promote visible signals or features.

Various types of image enhancement techniques are presently employed. One method is image-contrast manipulation, a technique for modifying image contrasts such that low-contrast areas are enhanced to achieve a more desirable contrast. Thus, weak image signals are converted into clearer visible information. The degree of contrast modification carried out on any particular image is a function of a contrast modification characteristic curve.

Linear-mean invariant transformation is another method wherein by mathematical modeling and algorithm implementation, the contrast modification characteristic curve is simplified by linear-mean invariant transformation. The benefits of linear-mean invariant transformation include: (1) a simplified linear transformation of the curve; (2) the original image mean and variance can be calculated; (3) the newly calculated mean-invariant may be given any desirable values; and (4) once the old and new mean and variance are known the image can be enhanced according to the algorithm.

Histogram equalization flattens the image histogram to obtain a uniformly bright output image. The equalization occurs in accordance with the mathematical expression:

$$H_o(k) = T_{eq}[H_i(k)] = 256\left[\sum_{p=0}^{k-1} H_i(p) + [H_i(k)]/2\right]$$

where:
$H_i(k)$ = the histogram of the input image;
$H_o(k)$ = the histogram of the output image;
$T_{eq}$ = the transformation for the histogram equalization.
Histogram equalization makes the occurrence of each possible gray level equally likely. Thus, the enhanced image will have a uniform brightness distribution.

All of the previously discussed image enhancement techniques are based upon global information over an entire image. However, when an input image has strong spatially dependent variation in image illumination, these image enhancement techniques cannot obtain high quality output images. Thus, localized image enhancements techniques have been developed to deal with this problem. Localized visual imagery enhancement techniques have been utilized which divide a visual image into a series of blocks and then determines the mean and variance of each block using a rule-based expert system. The enhanced individual block images are then recombined into a high-quality output image, based on a Gaussian image overlay recombination scheme.

The use of presently existing localized image enhancement techniques is limited to visual imagery and is not useful with a different kind of image such as a lofargram. As used herein, "lofargram" refers to low frequency analyzing and recording gram data. Furthermore, the use of a Gaussian technique for the recombination of enhanced image blocks is slower than might otherwise be accomplished utilizing a different type of method.

Thus, a need has arisen for a image enhancement system capable of operating upon the different information contained within a lofargram, to recombine the individually enhanced image blocks in a technique faster than presently existing methods and to take advantage of the different information content of a lofargram as compared to a visual image.

SUMMARY OF THE INVENTION

The method and apparatus of the present invention overcomes the foregoing and other problems associated with the prior art by using a modified rule-based method for enhancing lofargram images. The purpose of the present invention is to provide a gray-scale mapping of lofargram data enhancing it in such a way as to make signals of interest more readily visible and distinguishable from background noise and to display more clearly the structure of the signals for better characterization. The system will accept lofargram data and carry out an estimation process wherein the mean value and variance value of the frequency data within a lofargram are computed as a function of frequency for a series of vertical strips covering the lofargram image. A second operation is the actual image enhancement wherein a linear transformation of each pixel within the vertical strips covering the lofargram sample is performed. The coefficients of the linear transformation are determined from a rule-base acting on the mean and variance of the vertical strip from which the pixel was taken. The transformed data is then output as an enhanced lofargram image.

BRIEF DESCRIPTION OF THE DRAWINGS

For a more complete understanding of the present invention and the advantages thereof, reference is now made to the following detailed description taken in conjunction with the accompanying drawings in which:

FIGS. 3A and 3B is a flow chart illustrating one method for determining the mean average of a vertical frequency strip;

FIGS. 4A and 4B is a flow chart illustrating one method for determining the mean squared average of a vertical frequency strip.

DETAILED DESCRIPTION OF THE INVENTION

Figure 1:
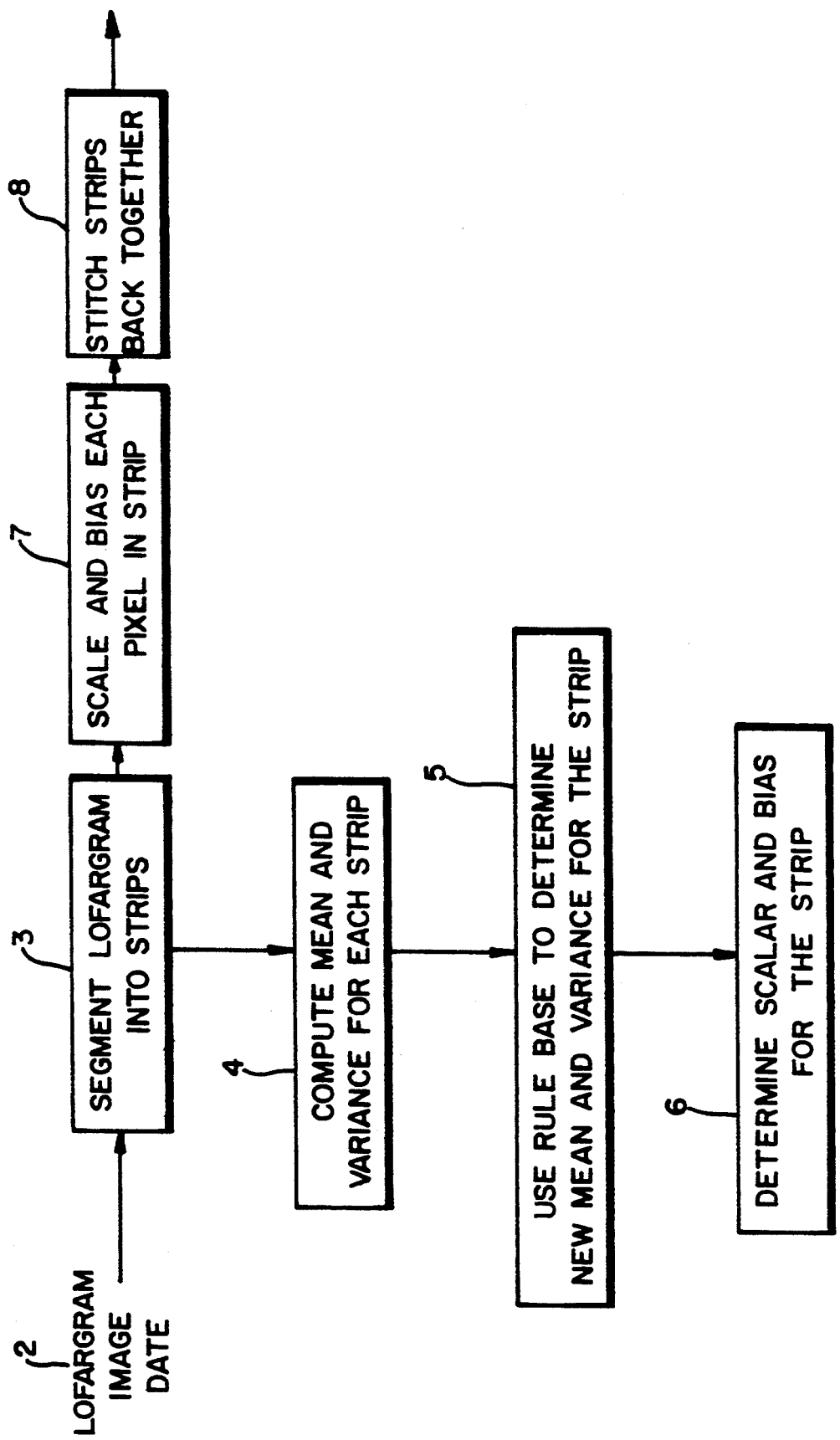
FIG. 1 is a flow chart illustrating the general method of the present invention.

Referring now to the drawings, and more particularly to FIG. 1, there is shown a flow diagram illustrating the general method for lofargram enhancement of the present invention. Initially a stream of lofargram image data 2 is segmented at step 3 into a number of vertical frequency strips covering the entire frequency range of a lofargram image. Next, an estimation process determines at step 4 the mean and variance of the frequencies within each vertical frequency strip. The estimation process will be more fully discussed with respect to FIGS. 2a through 4.

A rule base is utilized at step 5 to enhance the lofargram image data contained within each frequency strip. This is achieved by using the rule base to convert the old mean and variance for the frequency strip into a new, enhanced mean and variance. The new mean and variance are used to determine at step 6 a scaling and a biasing factor for the frequency strip, that enhances the strip to a visual range more easily viewed by the human eye. Using the scaling and biasing factors from surrounding vertical frequency strips, the scaling and biasing for each pixel within a vertical frequency strip may be interpolated at step 7. The procedures carried out in steps 5 through 7 are generally referred to as the enhancement operation. The enhanced frequency strips are then stitched back together at step 8 providing a complete, enhanced lofargram image.

Figure 2A:
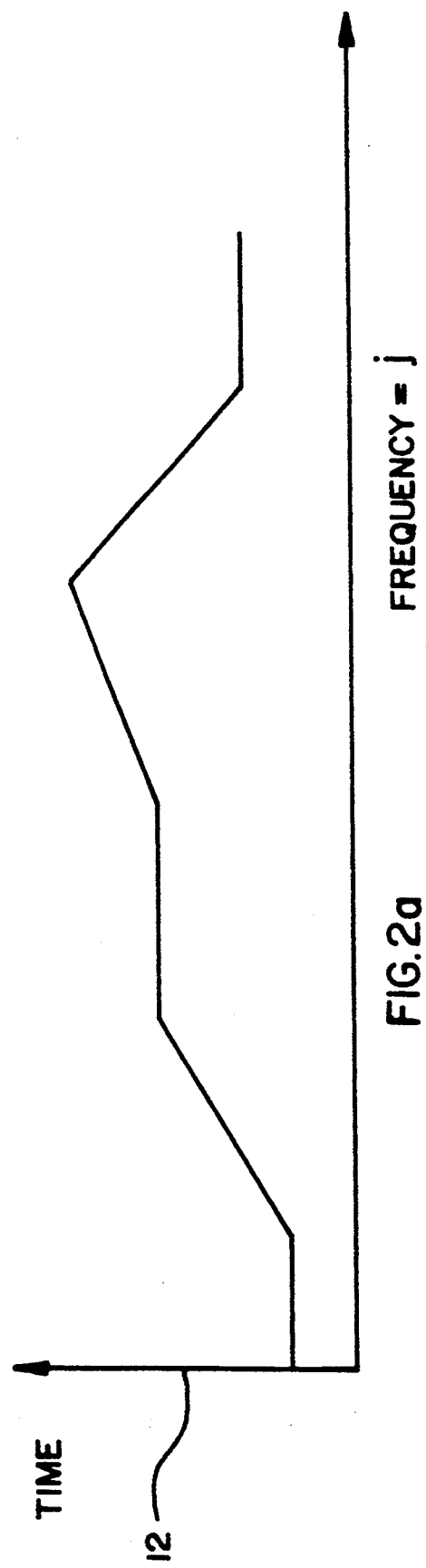
FIGS. 2a and 2b are an illustration of a lofargram and the samples taken of the lofargram as required by the present invention.
Figure 2B:
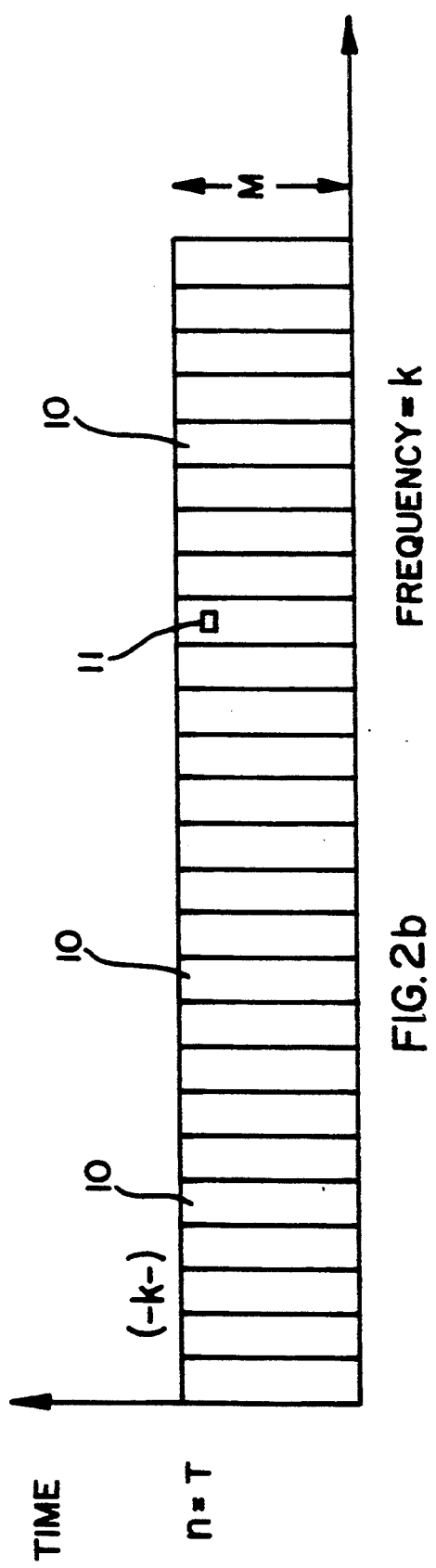

The estimation process will now be more fully discussed with respect to FIGS. 2a and 2b. FIG. 2a represents a lofargram data image 12. The image is a frequency versus time representation of data output from a spectrum analyzer. Such images are utilized in sonar detection devices to record sound frequencies detected over time. The lofargram 12 is a visual representation of the detected frequencies over time. Initially, as illustrated in FIG. 2b, a series of vertical strips 10 are defined covering the bandwidth of the lofargram 12. The vertical strips 10 are defined to cover frequency intervals k each of length M for an individual time slice. During the estimation process, the mean and variance of the frequencies of the lofargram 12 within the vertical strips 10 are computed and updated sequentially in time.

For each vertical strip 10 the mean and variance of the frequency are determined in the following manner. A vertical strip 10 is sampled at a plurality of times (t) covering the integration width M of the vertical strip 10. For each of these samples, the mean and mean square of the frequencies occurring at the sample time (t) for the vertical strip 10 are determined according to the following equations:

$$u_f(n,k) = \frac{1}{M} \sum_{j=Mk}^{Mk+k-1} P(n,j) \quad (1)$$

$$z_f(n,k) = \frac{1}{M} \sum_{j=Mk}^{Mk+M-1} P^2(n,j) \quad (2)$$

Where:
M = the integration width; and
k = average of individual frequency intervals;
$u_f$ = the mean frequency value at the time (t);
$Z_f$ = the mean square frequency at time (t)
P(n,j) = frequency value of the lofargram.

The bandwidth k over which the determination of the mean and mean square of the frequency for the vertical strips 10 takes place is a fixed value. The integration width M varies according to the resolution mode of the lofargram 2. The values of M corresponding to a particular resolution mode are listed below:

| Resolution Mode | Integration width |
| --- | --- |
| Broadband | 64 |
| Broad Vernier | 128 |
| Vernier | 256 |
| Super Vernier | 512 |
| Super Super Vernier | 1024 |

The mean and mean squared frequency values at each time (t) determined from equations (1) and (2) are individually averaged according to equations (3) and (4) to achieve the mean and mean squared value for a vertical strip 10. The mean and mean squared values of a vertical strip 10 are determined by averaging the frequency values determined at each time (t) for the vertical strip determined in equations (1) and (2).

$$u_s(n,k) = \frac{1}{n - n_o(n)} \sum_{n=n_o(n)}^{n} u_f(i,k) \quad (3)$$

$$z_s(n,K) = \frac{1}{n - n_o(n)} \sum_{n=n_o(n)}^{n} z_f(i,k) \quad (4)$$

Where:
$u_s$ (n,k) = mean frequency value of a vertical strip;
$z_s$ (n,k) = average frequency value of a vertical strip;
$n_o(n) = L \cdot \text{int} \{n/L\} - L$; and
L is the minimum integration length.

The solutions of equations (3) and (4) are used to determine the variance strip estimate.

$$v_s(n,k) = z_s(n,k) - u_s^2(n,k) \quad (5)$$

Referring now to FIGS. 3A, 3B, 4A and 4B, there are flow charts illustrating one method for calculating the mean and mean square of the frequency within a vertical frequency strip 10. The described method would utilize a processing unit (not shown) containing a number of counter and accumulator registers to carry out the described method. For ease of description the reference numbers within FIGS. 3 and 4 are identical, as the methods for determining the mean and mean squared are the same.

First counter registers $I_1$ and $I_2$ and accumulator registers $A_1$ and $A_2$ within the processing means (not shown) are initialized as shown at step 20. The minimum integration length L, is 240 scans lines. The lower limit of integration moves in discrete steps of length L so that the total integration interval varies between L and 2L. The first L=240 scans lines are handled separately from the general case. $A_L$ represents the average obtained there. A mean value calculated according to equation 1 is input at step 22. Upon receipt of a mean value, counters $I_1$ and $I_2$ are both incremented by one. Comparison step 26 determines if counter $I_1$ equals twice the integration length. If so, counter register $I_1$ and accumulator register $A_1$ are cleared and reset to zero. Comparison step 28 determines if counter register $I_1$ equals twice the integration length. If so, the counter register $I_2$ and accumulator register $A_2$ are reset to zero at step 29.

The mean average in accumulator registers $A_1$ and $A_2$ are updated at step 30. The update is performed by determining constant values $C_1$ and $C_2$, as shown at step 30, and then updating the mean average values in accumulator registers $A_1$ and $A_2$ using the constant values and the present mean value at time (t). A comparison is made at step 32 to determine if $I_1$ is greater than $I_2$. If $I_1$ is greater than $I_2$ the mean average is set equal to the value in accumulator register $A_1$. Otherwise, the mean average is set equal to the value in accumulator register $A_2$. Inquiry step 38 then checks for additional values of $u_f$ and control passes to step 22 if additional values exist. If no further values exist, the mean average for a vertical strip is the existing value of $u_f$. The calculation of the mean squared average is illustrated in FIGS. 4A and 4B and follows exactly the same procedure as described with respect to FIGS. 3A and 3B except that the mean squared value is used instead of the mean value in determining the mean squared average. The variance is then determined from the mean and mean squared averages as described in equation 5.

Once the variance and the mean frequency values are determined for the vertical strips 10, the enhancement procedures of steps 5 through 7 utilize a rule based table to enhance the pixels 11 within the vertical strip 10. Enhancement is accomplished by applying a linear transformation to the gray scale value (P) of each pixel 11 within a vertical strip 10. The pixel 11 is transformed to a more visible range and a new gray scale value ($P_{new}$) for the pixel is created by multiplying the previous pixel gray scale value by a scaling factor A to increase the variations between the visible elements of the pixel and then adding an offset factor B that biases the gray scale value of the pixel up or down to achieve an intermediate visual range more easily seen by a viewer. The general transformation is illustrated by the following equation:

$$P_{new} = (P-u)A(u,v) + u + B(u-v) \quad (6)$$

The linear transformation scaling factor A and transformation offset factor B are determined according to a rule base that provides enhanced values for the mean and variance and produces a value for $P_{new}$ in a desired viewing range. The rule base can be implemented in a number of fashions and is coded to suit the needs of a particular application.

Figure 5A:
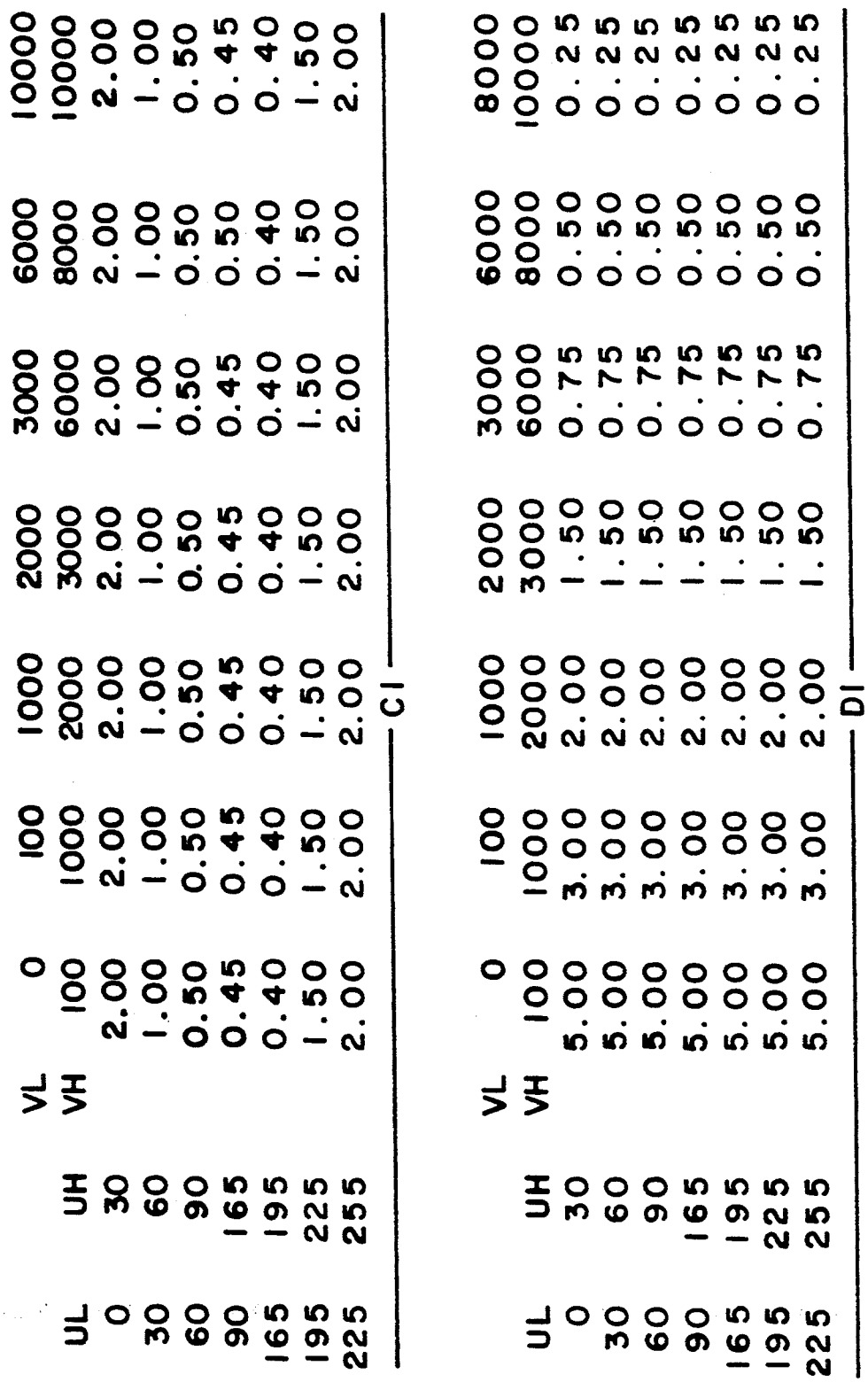
FIGS. 5A and 5B is a rule based table used to accomplish the linear transformation of the lofargram samples.
Figure 5B:
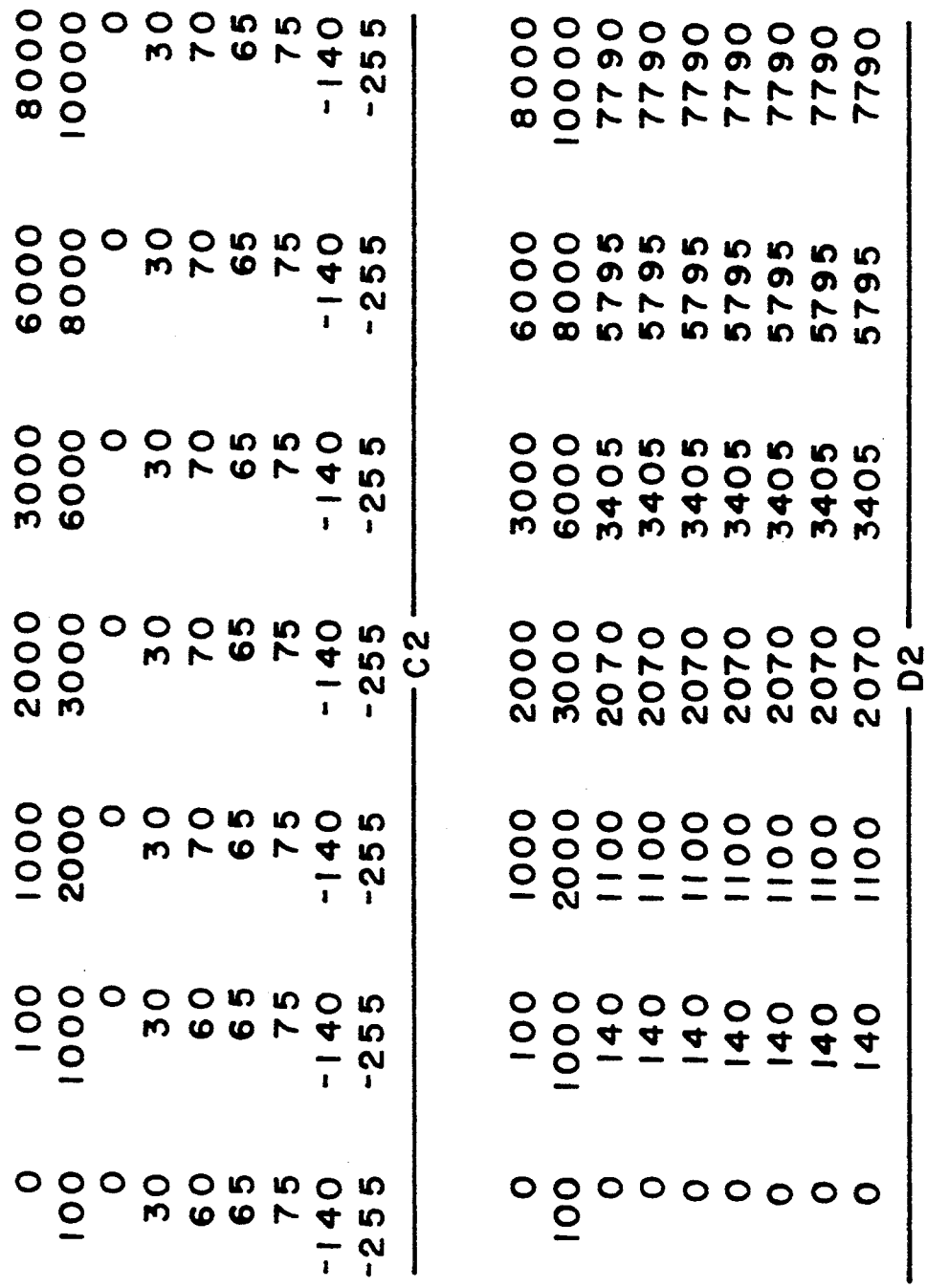

In one rule base embodiment illustrated in FIGS. 5A and 5B, the parameters A and B are determined from a 7×7 rule base table containing coefficients for calculating the parameters A and B in a piece-wise linear manner over the span of u and v for each pixel in a vertical strip 10. The mean and variance values for a pixel within a strip are interpolated from the vertical strip mean and variance estimates around the pixel. The intervals into which the mean u and the variance v are divided are listed below:

| Interval Number | Mean $u_L$-$u_H$ | Interval Number | Variance $v_L$-$v_H$ |
|---|---|---|---|
| 1 | 0–30 | 1 | 0–100 |
| 2 | 30–60 | 2 | 100–1000 |
| 3 | 60–90 | 3 | 1000–2000 |
| 4 | 90–165 | 4 | 2000–3000 |
| 5 | 165–195 | 5 | 3000–6000 |
| 6 | 195–225 | 6 | 6000–8000 |
| 7 | 225–255 | 7 | 8000–above |

The table allows the scaling factor $A(u,v)$ and the offset factor $B(u,v)$ to be determined for any mean and variance value. The scaling and offset factors are calculated according to the equations:

$$A(u,v) = \sqrt{V_{new}(u,v)/v} \quad (7)$$

$$B(u,v) = U_{new}(u,v) - u \quad (8)$$

Where:
$U_{new}$ = transformed mean value for a pixel;
$V_{new}$ = transformed variance value for a pixel;
$A(u,v)$ is the scaling factor;
$B(u,v)$ is the offset factor;
$u$ is the interpolated mean of the pixel; and
$v$ is the interpolated variance of the pixel.

FIGS. 5A and 5B illustrates a rule base table for performing linear transformations. The table contains the coded slope and intercept data describing the piecewise linear functions for the transformed mean $U_{new}$ and variance $V_{new}$ values. The table of FIG. 5 and the following equation are used to determine the enhanced mean and variance values:

$$U_{new} = C_1(I,J) \cdot u + C_2(I,J) \quad (9)$$

$$V_{new} = D_1(I,J) \cdot v + D_2(I,J) \quad (10)$$

Figure 3A:
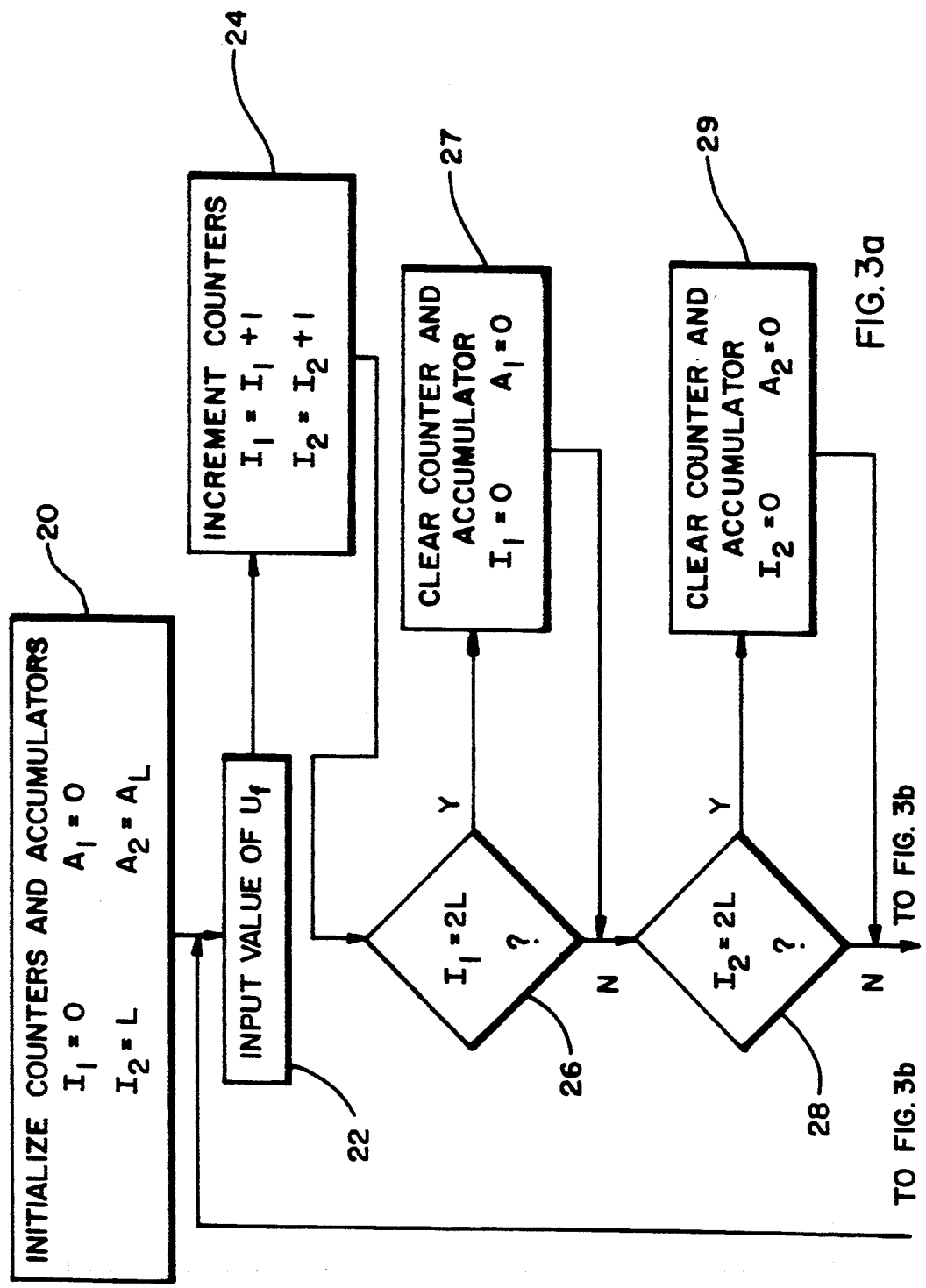
Figure 4B:
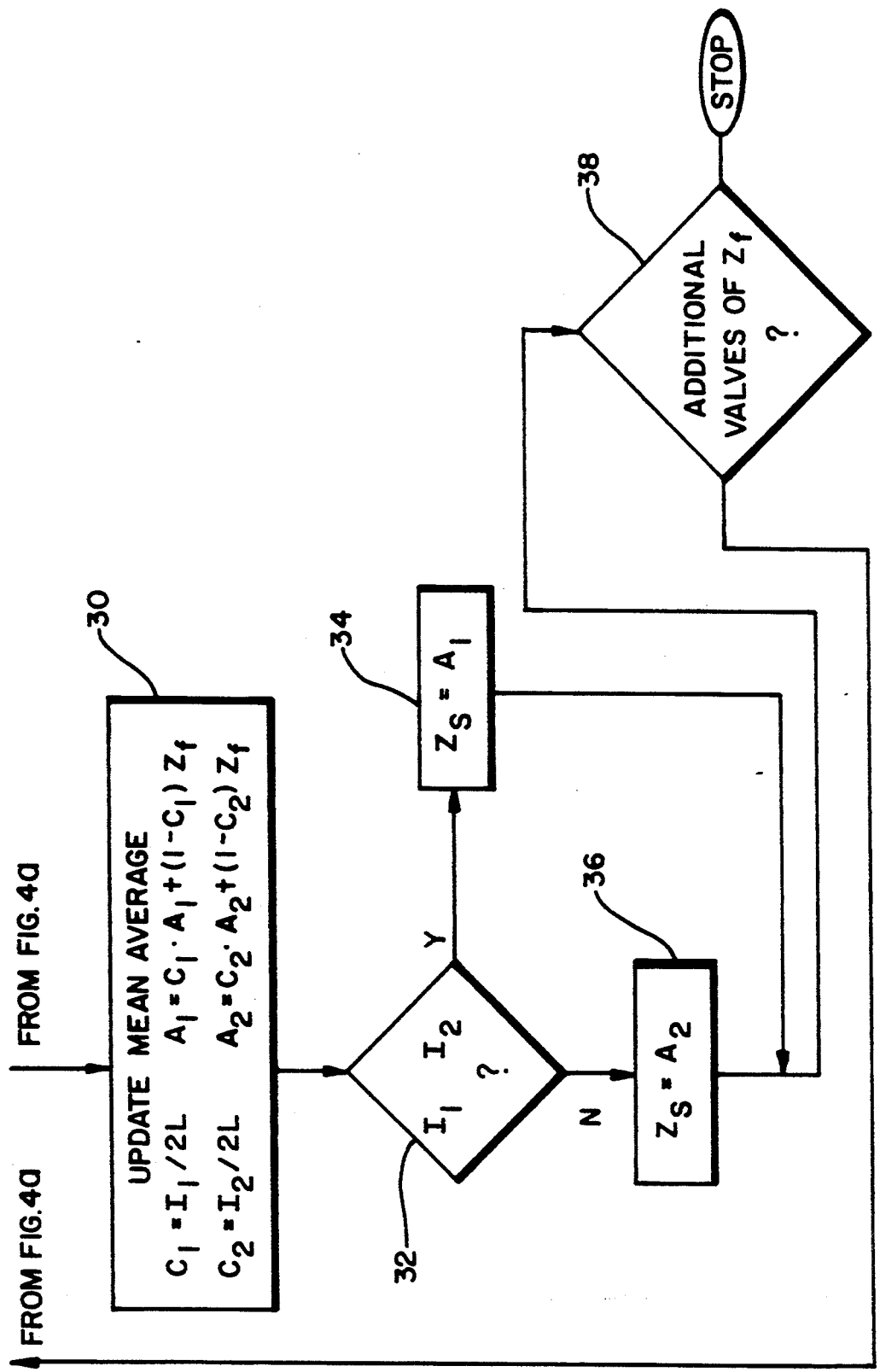

Using the interpolated mean and variance values for a pixel 11, the values of $C_1$, $C_2$, $D_1$ and $D_2$ can be determined from the rule based table (FIGS 3A and 3B). This is accomplished by choosing the row containing the range including the mean value of the pixel 11 and the column containing the range including the variance value of the pixel. The coefficient values $C_1$, $C_2$, $D_2$ and $D_2$ are thus easily found. The values of $U_{new}$ and $V_{new}$ are determined and substituted into equations (7) and (8) to determine the scaling and offset factors for the linear transformation equation (6). The scaling and offset factors are substituted into the linear transformation equation (6) to generate the necessary linear transformation of the lofargram pixel. This same process is repeated for each pixel within a vertical strip 10. The linear enhancement according to a preestablished rule base enhances the samples of the lofargram image by placing them in a more easily viewed visible range. The rule base further provides for smooth transitions between the pixels of the vertical strip 10.

In an alternative embodiment, a more efficient approach is to use the frequency mean and variance calculated for a vertical strip to access the rule base and find the offset and scaling parameters for each strip mean and variance instead of interpolating the mean and variance for each pixel. The offset and scaling parameters may then be interpolated for each pixel from the offset and sealing parameters of adjacent vertical frequency strips. Thus, the rule base needs to be accessed only 1/Nth as many times where N is the frequency strip width.

The scale factor A and offset B for each frequency strip k at each time slice n are defined as follows:

$$A(n,r) = \sqrt{V_{new}[u(n,k), v(n,k)]/v(n,k)} \quad (11)$$

$$B(n,r) = U_{new}[u(n,k), v(n,k)] - u(n,k) \quad (12)$$

A simplification to the basic transformation of equation (6) is also used:

$$P_{new} = (P - w)A + u + B \quad (13)$$
$$= P \cdot A + (u + B - uA)$$
$$= P \cdot A + T$$

The simplified offset T is computed for each strip and is equal to:

$$T(n,k) = U_{new}[u(n,k), v(n,k)] - u(n,k)A(n,k) \quad (14)$$

The scale factor A and simplified offset term T, as determined for each frequency strip, are interpolated to get a scaling factor a and offset t for each pixel within a vertical strip 10, according to the equations:

$$a(n,m) = \alpha H(n,k_L) + (1-\alpha)A(n,k_H) \quad (15)$$

$$t(n,m) = \alpha T(n,k_L) + (1-\alpha)T(n,k_H) \quad (16)$$

Where:
$\alpha = (MK_H - M)/M$; and
$(1-\alpha) = (M - MK_L)/M$

Finally the pixel is updated according to the transformation:

$$P_{new}(n,m) = P(n,m) \cdot a(n,m) + t(n,m) \quad (17)$$

When all of the pixels are enhanced within all of the vertical strips, the strips are stitched back together to create a lofargram image to a user in a more easily viewable form.

Although a preferred embodiment of the invention has been illustrated in the accompanying drawings and described in the foregoing Detailed Description, it will be understood that the invention is not limited to the embodiment disclosed, but is capable of numerous rearrangements and modifications of parts and elements without departing from the spirit of the invention.

I claim:

1. A method for enhancing a gathered lofargram data image comprising the steps of:
   segmenting the gathered lofargram data image into a series of vertical frequency strips, each frequency strip including a plurality of pixels;
   determining a mean and variance for the frequencies in each vertical frequency strip;
   adjusting the visibility of the pixels in each vertical frequency strip according to the determined mean and variance to generate a plurality of transformed vertical frequency strips; and
   recombining the transformed vertical frequency strips into an enhanced lofargram data image.

2. The method of claim 1 wherein the step of adjusting comprises the step of adjusting a gray scale value of each pixel, including the steps of:
   determining a scaling factor for the pixel from the determined variance;
   multiplying the gray scale value of the pixel by the scaling factor to increase the variations between visible elements of the pixel;
   determining a biasing factor for the pixel from the determined mean; and
   adding the biasing factor to the gray scale value of the pixel to move the gray scale value to an intermediate viewing range.

3. The method of claim 2, wherein the step of determining the scaling factor for each pixel comprises the steps of:
   accessing a rule base using the determined mean and variance of each vertical frequency strip to determine a scaling factor for each vertical frequency strip; and
   interpolating the scaling factors of adjacent vertical frequency strips to determine the scaling factor for the pixel.

4. The method of claim 2, wherein the step of determining a biasing factor for each pixel comprises the steps of:
   accessing a rule base using the determined mean and variance of each vertical frequency strip to determine a biasing factor for each vertical frequency strip; and
   interpolating the biasing factors of adjacent vertical frequency strips to determine the biasing factor for the pixel.

5. A method for enhancing lofargram data images comprising the steps of:
   segmenting a gathered lofargram data image into a series of vertical frequency strips, each strip including a plurality of pixels;
   determining a mean of the frequency for each vertical frequency strip;
   determining a variance of the frequency for each vertical frequency strip;
   determining a pixel scaling factor from the determined variance;
   modifying a gray scale value of each pixel with the pixel scaling factor;
   determining a pixel biasing factor from the determined mean;
   modifying the gray scale value of each pixel with the pixel biasing factor; and
   recombining the vertical frequency strips with the modified pixels into an enhanced lofargram data image.

6. A method for enhancing lofargram data images, comprising the steps of:
   gathering a lofargram data image;
   segmenting the lofargram data image into a plurality of frequency strips, with each frequency strip including a plurality of pixels, and with each pixel having a gray scale value;
   determining, for each of the plurality of frequency strips, a mean and variance of the frequencies within each frequency strip;
   adjusting the gray scale value of each pixel in each of the plurality of frequency strips in accordance with the determined means and variances to generate a plurality of transformed frequency strips; and
   combining the plurality of transformed frequency strips to produce an enhanced lofargram data image.

7. The method as in claim 6 wherein the step of adjusting comprises the steps of:
   scaling the gray scale value of each pixel; and
   biasing the gray scale value of each pixel.

8. The method as in claim 7 wherein the step of scaling comprises the step of multiplying the gray scale value of each pixel by a scaling factor determined from the means and variances of the frequency strips.

9. The method as in claim 7 wherein the step of biasing comprises the step of adding an offset factor determined from the means and variances of the frequency strips to the gray scale value of each pixel.

10. The method as in claim 6 further including the step of applying a rule base to determine from the means and variances the adjustment made to the gray scale value of each pixel.

11. A method for enhancing lofargram data images, comprising the steps of:

gathering a lofargram data image;

segmenting the lofargram data image into a plurality of frequency strips, with each frequency strip including a plurality of pixels;

determining, for each of the plurality of frequency strips, a mean and variance of the frequencies within each frequency strip;

generating a plurality of transformed frequency strips from the determined means and variances by:

increasing variation between the visible elements of each pixel; and adjusting the visibility of each pixel into a desired viewing range; and combining the plurality of transformed frequency strips to produce an enhanced lofargram data image.

12. The method as in claim 11 wherein each pixel has a gray scale value and the steps of increasing and adjusting respectively comprise the steps of:

scaling the gray scale value of each pixel; and biasing the gray scale value of each pixel.

13. The method as in claim 12 wherein the step of scaling comprises the step of multiplying the gray scale value of each pixel by a scaling factor determined from the means and variances of the frequency strips.

14. The method as in claim 12 wherein the step of biasing comprises the step of adding to the gray scale value of each pixel an offset factor determined from the means and variances of the frequency strips.

15. The method as in claim 11 further including the step of applying a rule base to determine from the means and variances the increases and adjustments made to each pixel.

* * * * *